United States Patent

Nelson

[15] 3,698,812
[45] Oct. 17, 1972

[54] MULTI-FUNCTION TELESCOPE

[72] Inventor: Harry Nelson, Los Angeles, Calif.
[73] Assignee: Hughes Aircraft Company, Culver City, Calif.
[22] Filed: Aug. 11, 1969
[21] Appl. No.: 849,220

[52] U.S. Cl. ..................................356/5, 356/141
[51] Int. Cl. ...............................................G01c 3/08
[58] Field of Search.....................356/4, 5, 141, 152

[56] References Cited

UNITED STATES PATENTS

| | | | |
|---|---|---|---|
| 2,953,059 | 9/1960 | Rodman et al. | 356/5 |
| 3,204,102 | 8/1965 | Hand, Jr. | 356/141 |
| 3,515,480 | 6/1970 | Altman et al. | 356/4 |
| 3,519,829 | 7/1970 | Pradel et al. | 356/4 |

*Primary Examiner*—Benjamin A. Borchelt
*Assistant Examiner*—N. Moskowitz
*Attorney*—Ernest L. Brown and W. H. MacAllister, Jr.

[57] ABSTRACT

A telescope which simultaneously receives a plurality of frequency-distinguishable radiation transmissions from an object and which coaxially transmits one of said frequencies through a single aperture. The apparatus essentially consists of a double Cassegrainian telescope including an apertured primary objective reflecting mirror, an apertured secondary mirror and a filter element disposed between said mirrors for passing radiation at one of said frequencies through the aperture in the primary mirror and for reflecting radiation at a second of said frequencies through the aperture in the secondary mirror.

9 Claims, 4 Drawing Figures

INVENTOR.
HARRY NELSON,
BY
J.K. Haskell
ATTORNEY.

MULTI-FUNCTION TELESCOPE

BACKGROUND OF THE INVENTION

1. Field of the Invention

The present invention relates to a multi-function telescope, and more particularly, this invention relates to a single-aperture range finder incorporating said telescope.

2. Description of the Prior Art

With the advent of Q-switched lasers, the short duration high-power pulses of light made possible very precise ranging. Laser IR space ranging systems are not vulnerable to electronic jamming and are convert, i.e., they do not transmit traceable electronic energy in order to acquire and track a target.

The output beam of the laser is not sufficiently narrow in beam width and must be processed through a collimating telescope. The light reflected from the target is gathered and filtered to reduce the effect of scattered light in a second large apertured telescope. An infrared tracking system is required to assure that the laser is pointed toward the desired target. Each of these components require separate apertures and optical elements which must be assembled and maintained with the optical axis of the elements in very close alignment. It is somewhat difficult to achieve consistent accuracy in pointing the laser at a target in the multi-apertured devices presently available.

OBJECTS AND SUMMARY OF THE INVENTION

Therefore, an object of the present invention is to provide a smaller and more compact assembly of optically aligned elements.

Another object of this invention is the provision of a plurality of optical functions in a single telescopic barrel.

A further object of the invention is to simultaneously receive two forms of radiation through a single aperture and to provide radiation transmission coaxially with the receiver aperture.

Yet another object of this invention is to provide a range finder which receives infrared tracking and laser ranging radiation in a single aperture.

These and other objects and many attendant advantages of the invention will become apparent as the description proceeds.

The multi-function telescope according to the invention includes an optical barrel supporting a series of elements on a common optical axis. A multi-output receiver telescope comprises a primary objective reflector having a central aperture, a secondary convex reflector having a central aperture positioned between the image point of the primary reflector and the primary reflector so as to reflect the image rays back toward the primary reflector aperture. A filter element is disposed between said primary and secondary reflectors for passing frequency of a first radiation through the primary reflector aperture and reflecting radiation of a second frequency through the secondary reflector aperture. Output of the second frequency radiation may be provided by disposing said orthogonal element so as to deflect the radiation passing through the secondary reflector in a path normal to the optical axis of the barrel.

A transmitter telescope may be disposed forward of the secondary reflector by providing an orthogonal element for reflecting transmitter radiation into a central coaxial bundle of rays which may be collimated by a collimating lens coaxially disposed in the telescope barrel. The multi-function telescope is readily adaptable to many uses such as a laser-IR ranging or tracking system comprising a multi-function telescope according to the invention. A laser is disposed to provide pulses of secondary radiation directed toward said deflecting element and projected through said collimating lens. A laser detector is disposed to receive the secondary radiation orthogonally deflected by said deflecting element. The system further includes an infrared detector disposed in front of the output aperture in said primary mirror. A digital counter is connected to the Q-switching section of the laser and to the laser detector. The infrared detector is utilized to track the target. When the telescope is targeted, the laser is fired and the Q-switch starts the counter. The signal from the laser detector terminates the count to provide a digital signal indicative of range which may be utilized for fire control or other purposes.

The invention will now become better understood by reference to the following detailed description when considered in conjunction with the accompanying drawings.

DESCRIPTION OF THE PREFERRED EMBODIMENTS

Figure 2:
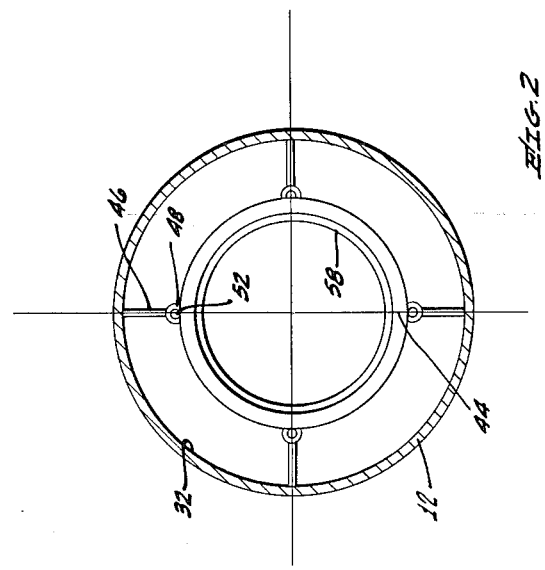
FIG. 2 is a view taken along the line 2—2 of FIG. 1.
Figure 1:
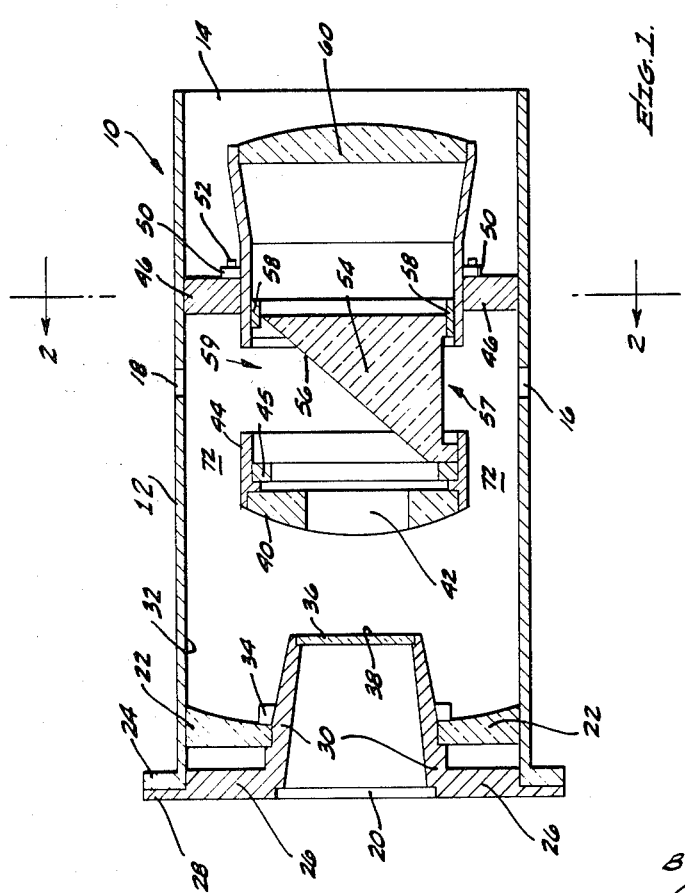
FIG. 1 is a cross-sectional view of a multi-function telescope according to the invention.

Referring now to FIGS. 1 and 2, the multi-function telescope 10 illustrated includes provision for simultaneous reception of two forms of radiation and radiation transmission coaxially with the receiver aperture. A single telescope barrel 12 has a receiver aperture end 14 and an input aperture 16 provided along the side of the barrel 10 in the vicinity of a primary radiation output aperture 18.

A secondary radiation aperture 20 is provided at the other end of the barrel through the axial bore of an annular primary objective reflector 22. A flange 24 is joined to this end of the barrel 10. An apertured end member 26 is fastened to the flange 24. The end member 26 includes a relieved outer section 28 forming a lip engaging the flange 24. A hollow conical tube portion 30 is jointed to the aperture of the end member and extends inwardly.

The aperture 20 in the primary reflector 22 is inserted over the tube 30 and is supported between the conical tube 30 and the inner wall 32 of the barrel 10. A retaining band 34 surrounding the tube 30 may be utilized to maintain the reflector 22 in position. The inner end surface of the tubing is received to form a seat for a selective filter element 36. The filter 36 selectively passes one form of radiation and reflects the other. Suitably the filter may contain a dichroic coating 38.

A secondary reflector 40 having an aperture 42 is mounted in the back end of an internal coaxially supported barrel 44. An inwardly facing boss 45 formed near the back end of the barrel forms a stop for the reflector 40. The barrel 44 is centrally supported by means of a series of thin ribs 46 attached to the inner wall 32 of the barrel. The ribs terminate in hollow pin receiving cylinder 48 and may be aligned adjacent aperture flanges 50 extending from the inner barrel 44. Insertion of pins 52 through the flanges 50 into the cylinders 48 completes the assembly.

The barrel further contains a prism 54 having a reflecting surface 56 disposed behind the aperture 42 in secondary reflector 40. A seating ring 58 may be installed surrounding the forward end of the prism. The inner barrel 44 further contains an aperture 57 facing aperture 16 and aperture 59 facing aperture 18. The forward end of the barrel tapers outwardly and receives a collimating lens 60.

Figure 3:
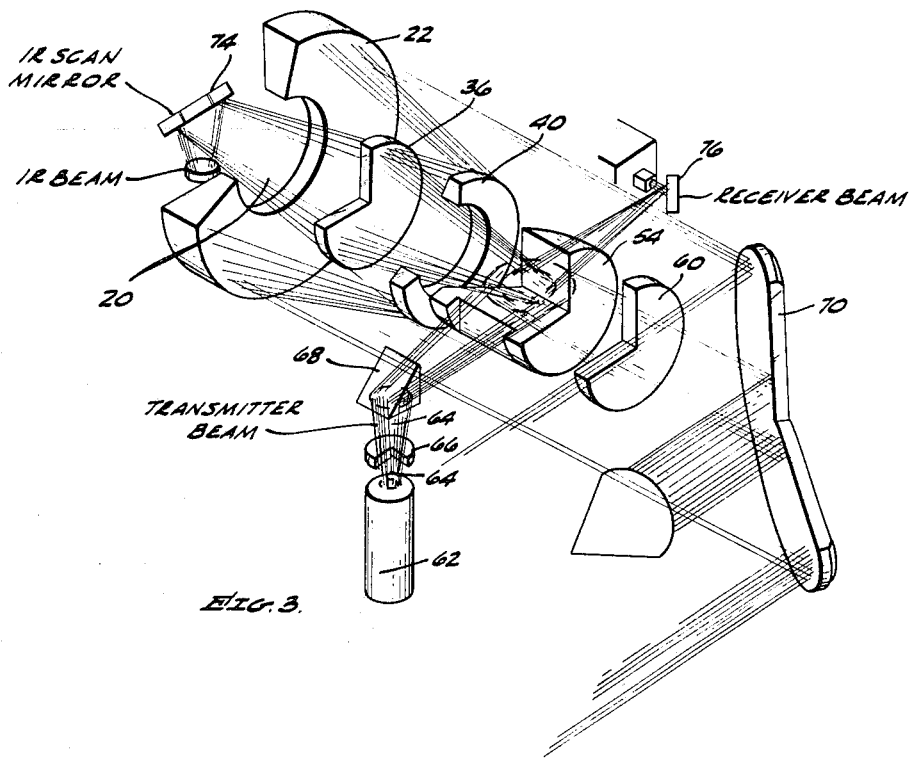
FIG. 3 is an optical schematic view in perspective of the telescope illustrated in FIG. 1.

Referring now to FIG. 3, a transmitting telescope is formed by lens 66, prism 68, prism 54 and collimating lens 60. A light source such as laser 62, emits a beam 64 which is broadened in lens 66, and reflected by prism 68 through input aperture 16 onto a silvered reflecting face of prism 54. The beam 64 is collimated by lens 60 and can be projected by a field of view scan mirror 70. The prism 54 and lens 60 of the transmitting telescope fit compactly into the core space not utilized in a Cassegrainian type of mounting.

The annular space 72 in the aperture is then utilized to receive two forms of radiation from an object such as the reflected laser beam and infrared energy emanating from a target in a ranging application. The laser and infrared light beam emanating from the object is deflected off field of view scan mirror 70 into the annular space 72. The beam is reflected by primary reflector 22 onto the face of secondary reflector 40. The secondary reflector 40 further reflects the beam onto the dichroic filter element 36. The infrared component of the beam is passed and leaves the telescope 10 through the aperture 20 in primary reflector 22 and is deflected by an IR scan mirror 74 to further processing apparatus.

The laser component is reflected by the dichroic element 36 through the aperture 42 in secondary reflector 40 onto the external silvered face 56 of prism 54. The face 56 is disposed to deflect the received laser beam through the primary radiation output aperture 18 onto a mirror 76 which deflects the beam onto a photoresponsive element or other suitable device.

Figure 4:
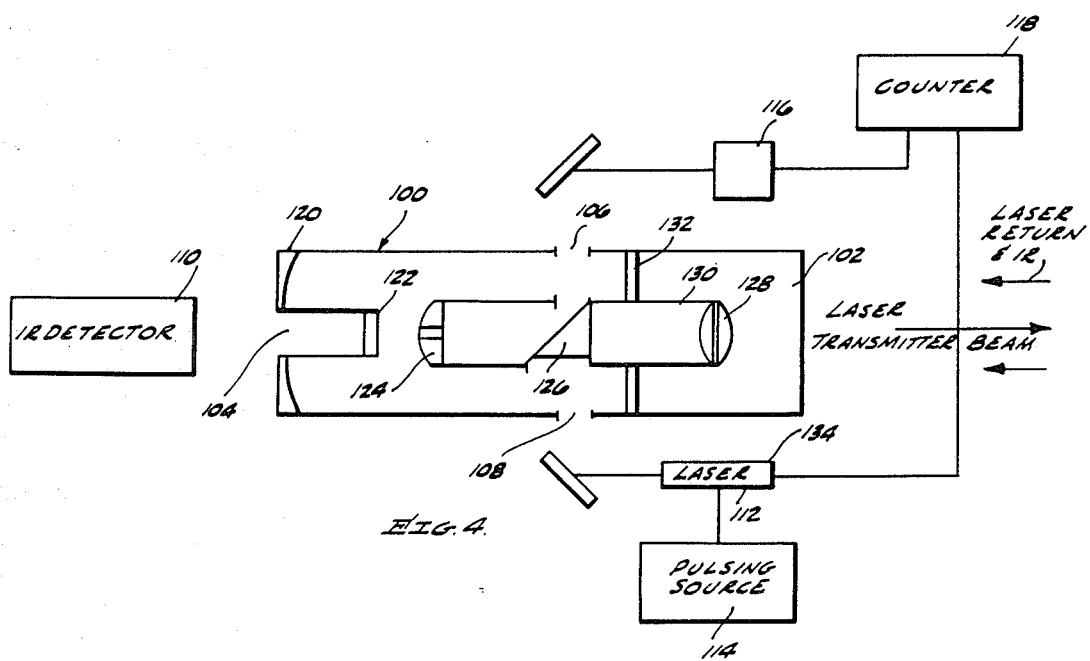
FIG. 4 is a schematic view of an IR-laser ranging system according to the invention.

Referring now to FIG. 4, a ranging system is illustrated incorporating a multi-function telescope according to the invention. The ranging system comprises a telescope 100 having a combined laser beam transmitting and radiation receiving annular, coaxial aperture 102. The received mixed IR and laser radiation beam is resolved and emitted from the telescope through a first axial IR receive aperture 104 and a second transverse laser receive aperture 106. A further transverse aperture 108 is provided for introduction of laser light.

The system further includes an IR detector 110, a laser 112, a laser pulse source 114, a laser detector 116 and a digital counter 118. The Q-switching section 134 of the laser is connected to the starting switch of the counter 118 and the terminating switch of the counter 118 is connected to the laser detector 116.

The telescope contains a primary apertured objective mirror 120, a dichroic filter 122, an apertured secondary mirror 124, reflecting prism 126 and collimating lens 128. The last three elements are mounted in barrel 130 which is coaxially supported in telescope 100 by means of struts 132.

When the IR detector signal from the object being tracked is at a peak, the telescope is properly aimed at the target. The pulsing source is energized and the Q-switching section 134 which fires a giant laser pulse simultaneously switches on the counter 118. The return signal of the laser as indicated in the laser detector 116 terminates the count. This results in a digital count that can be directly calibrated in distance.

The telescope of the invention will also find use in surveying, fire control systems, bombing systems and the like. It is to be understood, therefore, that only preferred embodiments of the invention have been disclosed and that numerous substitutions, alterations and modifications are permissable without departing from the scope of the invention.

What is claimed is:

1. A multi-function telescope comprising:
 a housing means having an aperture for receiving a beam containing at least two forms of radiation;
 means mounted within said housing means for concurrently resolving said beam into an axial component of one of said forms of radiation and a non-axial component of said other form of radiation;
 an annular concave primary reflector and an annular obtuse secondary reflector positioned to reflect said axial component through the bore of said annular primary reflector;
 transmitting means coaxially disposed within said telescope for directing a beam of one of said forms of radiation outward through said aperture;
 a non-axial aperture formed in said telescope;
 a filter transparent to said axial component and reflective to said non-axial component; and
 a non-axial radiation deflector disposed in a position to cause said non-axial component to be reflected axially from said filter, through the bore of said secondary reflector onto said deflector and out said non-axial aperture of said telescope.

2. A multi-function telescope comprising:
 a housing means having a single receive aperture for receiving a beam containing at least two forms of radiation;
 means mounted within said housing means for resolving said beam into an axial component of one of said forms of radiation and a non-axial component of said other form of radiation;
 an annular primary reflector and a secondary reflector positioned to reflect said axial component through the bore of said annular primary reflector;
 transmitting means coaxially disposed within said telescope for directing a beam of one of said forms of radiation through said receive aperture.
 a non-axial aperture formed in said telescope;
 a dichroic filter transparent to said axial component and reflective to said non-axial component, said secondary reflector including a central passage; and a non-axial radiation deflector disposed behind said passage in a position to cause said non-axial component to be reflected from said filter, through said passage onto said deflector and out said non-axial aperture of said telescope.

3. A telescope according to claim 2 in which said housing comprises a cylindrical outer barrel.

4. A telescope according to claim 3 further including an inner barrel, means for mounting said secondary reflector and deflector within said inner barrel and means for coaxially mounting said inner barrel within said outer barrel.

5. A telescope according to claim 4 in which said inner barrel further includes a transmission radiation collimating lens disposed between said deflector and receive aperture.

6. A multi-function telescope comprising:
an optical barrel having a single receiving aperture;
an annular primary objective reflector means mounted in the end of said barrel opposite to said aperture and said reflector including a first output aperture;
a secondary annular reflector defining a central passage disposed before the image point of said primary reflector and adapted to reflect the radiation from the primary reflector through the first output aperture; and
radiation resolving means disposed between said primary and secondary reflectors transparent to one form of radiation and reflective to another form and adapted to pass said one form through said first output aperture and reflect said second form through the passage in said secondary mirror.

7. A multi-function telescope comprising:
an optical barrel having an axial receiving aperture and a transverse output aperture;
an annular primary objective reflector means mounted in the end of said barrel opposite to said receiving aperture, and said reflector including a first axial output aperture;
a secondary annular reflector defining a central passage disposed before the image point of said primary reflector and adapted to reflect the radiation from said primary reflector through said first axial output aperture;
deflection means mounted axially behind said passage to deflect said second form of radiation through said transverse output aperture; and
radiation resolving means disposed between said primary and secondary reflectors transparent to one form of radiation and reflective to another form and concurrently passing said one form through said first axial output aperture and reflecting said second form through said passage in said secondary mirror and through said transverse output aperture.

8. A telescope according to claim 7 wherein said barrel includes a radiation input aperture disposed to direct a beam onto the rearward face of the deflection means and a collimating lens mounted rearward of said face adapted to collimate input radiation and project a beam of said input radiation through said single receiving aperture.

9. A ranging system comprising:
a telescope having a single radiation receiving aperture, an axial output aperture, a non-axial output aperture and an input aperture;
annular objective means mounted within said telescope for resolving received radiation into an axial component and a non-axial component directed toward said axial and non-axial apertures, respectively;
infrared detecting means disposed to detect the radiation output from one of said output apertures;
laser detecting means disposed to detect the laser radiation output of the other of said output apertures;
co-axial laser collimating means mounted within said telescope;
laser transmission means disposed to emit a pulse toward and through said input aperture; and
ranging means associated with said laser means and laser detecting means for providing a signal indicative of the range of an object.

* * * * *